(12) United States Patent
Ransford et al.

(10) Patent No.: US 12,051,519 B2
(45) Date of Patent: Jul. 30, 2024

(54) QUBIT READING PROCEDURE INCLUDING COHERENT SHELVING

(71) Applicant: Quantinuum LLC, Broomfield, CO (US)

(72) Inventors: Anthony Ransford, Broomfield, CO (US); Sara Campbell, Boulder, CO (US); Bryce Bjork, Louisville, CO (US)

(73) Assignee: Quantinuum LLC, Broomfield, CO (US)

( * ) Notice: Subject to any disclaimer, the term of this patent is extended or adjusted under 35 U.S.C. 154(b) by 310 days.

(21) Appl. No.: 17/583,308

(22) Filed: Jan. 25, 2022

(65) Prior Publication Data

US 2022/0270776 A1 Aug. 25, 2022

Related U.S. Application Data

(60) Provisional application No. 63/200,263, filed on Feb. 25, 2021.

(51) Int. Cl.
*G21K 1/00* (2006.01)
*G02F 3/02* (2006.01)
*G06N 10/20* (2022.01)
*G06N 10/40* (2022.01)

(52) U.S. Cl.
CPC .............. *G21K 1/003* (2013.01); *G02F 3/02* (2013.01); *G06N 10/20* (2022.01); *G06N 10/40* (2022.01)

(58) Field of Classification Search
CPC ........ G21K 1/003; G21K 1/006; G06N 10/00; G06N 10/20; G06N 10/40; G02F 3/02
See application file for complete search history.

(56) References Cited

U.S. PATENT DOCUMENTS

2021/0028863 A1* 1/2021 Faraon ................... B82Y 10/00

OTHER PUBLICATIONS

Edmunds et al., "Scalable hyperfine qubit state detection via electron shelving in the 2D5/2 and 2F7/2 manifolds in 171Yb", Jan. 1, 2021, Cornell University Online Library, pp. 1-12 (Year: 2021).*
Roman et al., "Coherent control for qubit state readout", Nov. 25, 2019, Cornell University Online Library, pp. 1-7 (Year: 2019).*

(Continued)

*Primary Examiner* — David E Smith
*Assistant Examiner* — Hsien C Tsai
(74) *Attorney, Agent, or Firm* — Alston & Bird LLP (57) ABSTRACT

Methods and controllers for reading a quantum state of an atomic object and/or qubit using coherent shelving are provided. A controller causes a first beam of a first wavelength and a second beam of a second wavelength to be incident on the qubit and causes a reading beam to be incident on the qubit. The first wavelength and the second wavelength are configured to couple a state of a qubit space of the qubit to a stable state. The stable state has a lifetime that is longer than a length of time required for performing a reading operation. The first beam and the second beam are generated by at least one manipulation source operated by at least one manipulation source driver of and/or in communication with and/or controlled by the controller.

20 Claims, 6 Drawing Sheets

(56) References Cited

OTHER PUBLICATIONS

Azurlight Systems, "High Power 1064 NM Fiber Lasers & Amplifiers", online webpage, retreived from the Internet at <https://azurlight-systems.com/portfolio_page/1064-nm-high-power-fiber-lasers-amplifiers-50w-single-mode-single-frequency/> on Sep. 20, 2022, 3 pages.

Covesion, "Example of uses of PPLN", online article, Nov. 12, 2020, retreived from the Internet at <https://covesion.com/en/resource/example-uses-of-ppln/> on Sep. 20, 2022, 3 pages.

Crain, Stephen, et al., "High-speed low-crosstalk detection of a 171Yb+ qubit using superconducting nanowire single photon detectors", Communications Physics, Aug. 21, 2019, vol. 2, No. 92, retreived from the Internet at <https://www.nature.com/articles/s42005-019-0195-8#citeas> on Sep. 20, 2022, 6 pages.

Edmund Optics, Inc., "UV vs. IR Grade Fused Silica", online webpage, retreived from the Internet at <https://www.edmundoptics.com/knowledge-center/application-notes/optics/uv-vs.-ir-grade-fused-silica/> on Sep. 20, 2022, 2 pages.

Edmunds, C. L., et al., "Scalable hyperfine qubit state detection via electron shelving in the $\wedge 2D\_5/2$ and $\wedge 2F\_7/2$ manifolds in $171Yb\wedge+$", Jan. 1, 2021, available at arxiv.org, Cornell University Online Library, on Dec. 29, 2020, XP081848529, 12 pages.

Extended European Search Report and Written Opinion Mailed on Sep. 12, 2022 for EP Application No. 22158304, 7 pages.

ISOMET, "Acousto-optics: Modulators Mid IR-IR", online webpage, 2014, retrieved from the Internet at <https://isomet.com/modmidnir.html> on Sep. 20, 2022, 1 page.

ISOMET, "Acousto-optics: Standard AR Coatings", online webpage, 2014, retrieved from the Internet at <https://isomet.com/arhome.html> on Sep. 20, 2022, 1 page.

NKT Photonics, "Koheras ADJUSTIK—single-frequency lasers", webpage, retreived from the Internet at <https://www.nktphotonics.com/products/single-frequency-fiber-lasers/koheras-adjustik/> on Sep. 20, 2022, 5 pages.

Ransford, Anthony M., "Old Dog, New Trick: High Fidelity, Background-free State Detection of an Ytterbium Ion Qubit", UCLA Electronic Theses and Dissertations, 2020, retrieved from the Internet at <https://escholarship.org/uc/item/0w2418kr> on Sep. 20, 2022, 139 pages.

Roman, Conrad, et al., "Coherent control for qubit state readout", Nov. 25, 2019, available at arxiv.org, Cornell University Online Library, on Nov. 22, 2019 XP081537876, 7 pages.

SRICO, "Fiber-Coupled PPLN Waveguide Device", Product Data Sheet, uploaded Jun. 2017, retrieved from the Internet at <https://www.srico.com/wp-content/uploads/2017/06/SRICO_FiberCoupled-PPLN-Waveguide.pdf> on Sep. 20, 2022, 1 page.

\* cited by examiner

QUBIT READING PROCEDURE INCLUDING COHERENT SHELVING

CROSS-REFERENCE TO RELATED APPLICATIONS

This application claims priority to U.S. Application No. 63/200,263, filed Feb. 25, 2021, the content of which is hereby incorporated herein in its entirety by reference.

TECHNICAL FIELD

Various embodiments relate to apparatuses, systems, and methods relating to determining a quantum state of an atomic object trapped in an atomic object containment apparatus. For example, some example embodiments relate to a reading procedure for reading the state of a qubit of a trapped atomic object quantum computer using ion shelving.

BACKGROUND

An ion trap can use a combination of electrical and magnetic fields to capture a plurality of atomic objects in a potential well. Atomic objects can be trapped for a number of purposes, which may include mass spectrometry, research, and/or controlling quantum states, for example. In various scenarios it may be important to determine a quantum state of an atomic object quickly and with a high level of accuracy. For example, the trapped atomic objects may be used as qubits of a trapped atomic object quantum computer. The qubit space used as the two states of the qubit may have similar energy levels. This may cause off resonant errors to be introduced into quantum state determinations. Through applied effort, ingenuity, and innovation many deficiencies of prior atomic object quantum state determination techniques have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for performing quantum state determination of atomic objects trapped in an atomic object containment apparatus. For example, various embodiments provide methods, systems, apparatuses, computer program products, and/or the like for qubit reading operations that do not include and/or that provide a technical solution to the technical problem of off resonant errors in qubit reading. For example, various embodiments provide methods, systems, apparatuses, computer program products, and/or the like that have reduced off resonant errors (with respect to conventional qubit reading processes). For example, in a trapped atomic object quantum computer, an atomic object trapped in an atomic object containment apparatus may be used as a qubit of the quantum computer. Two quantum states of the hyperfine structure of the atomic object may be used as the qubit space with one of the two quantum states referred to as up or 1 and the other of the two quantum states referred to as down or 0. The two quantum states of the hyperfine structure used as the qubit space may have similar energy levels. For example, the two quantum states of the qubit space may be separated by less than 50 gigahertz (GHz) (e.g., less than 13 GHz).

Conventional reading procedures apply a laser beam to the atomic object to be read that couples only one of the qubit states. As used herein, the term a reading procedure is a process used to determine the quantum state of an atomic object. When the quantum state of the atomic object collapses into the coupled state of the qubit space during the measurement process, the laser will excite it, resulting in a photon being released when the atomic object decays from the excited state. After decay, the atomic object is continually excited by the laser and repeatedly emits photons. These photons can be collected using various photodetectors. If the quantum state of the atomic collapses into the other (uncoupled) qubit state, then the atomic object does not interact with the laser and no photon is emitted. However, the closer the two quantum states of the qubit space are in energy, the more likely it becomes that a qubit having a quantum state that collapses into the uncoupled qubit state will interact with the laser, leading to off resonant errors.

Various embodiments provide a reading procedure that includes a coherent shelving approach to reduce and/or prevent off resonant errors. In particular, a first beam of a first wavelength and a second beam of a second wavelength may be applied to an atomic object to be read. The first and second beams are configured to couple a first state of the qubit space to a stable state outside of the qubit space. For example, if the quantum state of the atomic object collapses to the first state of the qubit space, the quantum state of the atomic object is evolved to a stable state that is outside of the qubit space. In various embodiments, the atomic object is coherently evolved to the stable state. For example, the atomic object is "shelved" for the reading procedure by evolving the quantum state of the atomic object to the stable state. If the quantum state of the atomic object collapses to a second state of the qubit space, the quantum state of the atomic object is not affected by the first and second beams and remains in the second state. A reading beam may then be applied to the atomic object. If the quantum state of the atomic object collapsed to the second state, the reading beam will interact with the atomic object and cause photons to be emitted. The photons may be detected with a photon detector. If the quantum state of the atomic object collapsed to the first state and was then evolved to the stable state, the reading beam will not interact with the atomic object such that photons are not emitted. Moreover, the stable state has an energy level that is not similar to either state of the qubit space. For example, the stable state may be separated from both levels of the qubit space by at least 100 GHZ (e.g., at least one terahertz (THz)). The energy difference between the second state of the qubit space and the stable state is large enough that the reading operation is not affected by off resonant errors.

According to an aspect of the present disclosure, a method for reading a qubit of a trapped ion quantum computer, including a coherent shelving procedure, is provided. In an example embodiment, the method comprises causing, by a controller of the trapped ion quantum computer, a first beam of a first wavelength and a second beam of a second wavelength to be incident on the qubit. The first wavelength and the second wavelength are configured to couple a state of a qubit space of the qubit to a stable state. The stable state has a lifetime that is longer than a length of time required for performing a reading operation. The method further comprises causing, by the controller, the reading operation to be performed on the qubit.

In an example embodiment, the qubit is a singly ionized ytterbium atom, the first wavelength is 411 nm, the second wavelength is 3.4 microns, and the stable state is in the F manifold.

In an example embodiment, the method further comprises receiving, by the controller, a signal from photodetector; and determining, by the controller and based on the signal, a quantum state of the qubit.

In an example embodiment, causing the reading operation to be performed comprises causing a reading beam to be incident on the qubit and monitoring a signal generated by a photodetector to determine whether or not the qubit fluoresces responsive to the reading beam being incident on the qubit.

In an example embodiment, the method further comprises re-initializing the qubit.

In an example embodiment, re-initializing the qubit comprises causing a third beam of a third wavelength and a fourth beam of the second wavelength to be incident on the qubit.

In an example embodiment, the third beam and the fourth beam are incident on the qubit at least partially overlapping in time.

In an example embodiment, the qubit is a singly ionized ytterbium atom, the second wavelength is 3.4 microns, and the third wavelength is 976 nm.

In an example embodiment, the third and fourth beam are incident on the qubit for a period of time that is less than 30 milliseconds.

In an example embodiment, the method further comprises, while executing a quantum circuit, determining that the qubit is to be read, wherein the first beam and second beam are caused to be incident on the qubit responsive to determining that the qubit is to be read. In an example embodiment, the method further comprises, after re-initializing the qubit, using the qubit to continue execution of the quantum circuit.

According to another aspect of the present disclosure, a controller of a trapped ion quantum computer is provided. In an example embodiment, the controller comprises at least one processing device, the at least one processing device in communication with at least one manipulation source driver. The processing device is configured to cause the controller to cause a first beam of a first wavelength and a second beam of a second wavelength to be incident on the qubit, and cause a reading beam to be incident on the qubit. The first wavelength and the second wavelength are configured to couple a state of a qubit space of the qubit to a stable state. The stable state has a lifetime that is longer than a length of time required for performing a reading operation. The first beam and the second beam are generated by at least one manipulation source operated by the at least one manipulation source driver.

In an example embodiment, the qubit is a singly ionized ytterbium atom, the first wavelength is 411 nm, the second wavelength is 3.4 microns, and the stable state is in the F manifold.

In an example embodiment, the processing device is in communication with a photodetector and the processing device is further configured to cause the controller to receive a signal from the photodetector, wherein the signal corresponds to a result of the reading beam being incident on the qubit; and determine, based on the signal, a state of the qubit.

In an example embodiment, to cause the reading operation to be performed, the processing device is configured to cause a reading beam to be incident on the qubit and monitor a signal generated by a photodetector to determine whether or not the qubit fluoresces responsive to the reading beam being incident on the qubit.

In an example embodiment, the processing device is further configured to cause the controller to re-initialize the qubit.

In an example embodiment, re-initializing the qubit comprises causing a third beam of a third wavelength and a fourth beam of the second wavelength to be incident on the qubit.

In an example embodiment, the third beam and the fourth beam are incident on the qubit at least partially overlapping in time.

In an example embodiment, the qubit is a singly ionized ytterbium atom, the second wavelength is 3.4 microns, and the third wavelength is 976 nm.

In an example embodiment, the third and fourth beam are incident on the qubit for a period of time that is less than 30 milliseconds.

In an example embodiment, the processing device is further configured to, while executing a quantum circuit, determine that the qubit is to be read, wherein the first beam and second beam are caused to be incident on the qubit responsive to determining that the qubit is to be read.

In an example embodiment, the processing device is further configured to, after re-initializing the qubit, use the qubit to continue execution of the quantum circuit.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

In various embodiments, methods, apparatuses, systems, computer program products, and/or the like for performing a reading procedure including coherent shelving are provided. In various embodiments, the reading procedure is used to determine the quantum state of an atomic object. In various embodiments, the atomic object is an ion or atom. In an example embodiment, the atomic object is singly ionized ytterbium. In an example embodiment, the atomic object is trapped in an atomic object confinement apparatus, such as an ion trap. In various embodiments, the atomic object is used as a qubit of a trapped atomic object quantum computer. For example, the reading procedure may be used to cause the wave function of the atomic object to collapse and to determine whether the qubit, as a result of the wave function collapse, is in a first state or a second state of a two state qubit space defined for the qubit.

In various embodiments, the reading procedure comprises performing a shelving procedure, reading the qubit, and, optionally, performing a de-shelving procedure. The shelving procedure comprises causing a first beam of a first wavelength and a second beam of a second wavelength to be incident on the atomic object to be read. The first and second beams are configured to couple a first state of the qubit space to a stable state outside of the qubit space. The stable state has a lifetime that is longer than the time needed to read the qubit. For example, when the quantum state of the atomic object collapses to the first state of the qubit space, the quantum state of the atomic object is evolved to a stable state that is outside of the qubit space by the application of the first and second beams to the qubit to be read. In various embodiments, the atomic object is coherently evolved to the stable state. As should be understood, coherently evolving the atomic object from the first state to the evolved stable state amounts to applying a unitary transformation to the system via application of the first and second beams to the qubit to be read. This is in contrast to incoherent evolution of a quantum state which amounts to a non-unitary transformation of the system. Additionally, the coherent evolution of the atomic object to the stable state does not have the time limitations of conventional incoherent evolution of quantum states for the sake of shelving during a reading operation. In other words, the atomic object is coherently shelved for performance of the reading operation. Moreover, because the atomic object is coherently shelved, quantum information stored by the atomic object is not disturbed. In contrast, incoherent shelving of the atomic object tends result in corruption of the quantum information stored by the incoherently shelved atomic object.

When the quantum state of the atomic object collapses to a second state of the qubit space, the quantum state of the atomic object is not affected by the first and second beams and remains in the second state. A reading beam may then be applied to the atomic object. If the quantum state of the atomic object collapsed to the second state, the reading beam will interact with the atomic object and cause photons to be emitted. The photons may be detected with a photon detector. If the quantum state of the atomic object collapsed to the first state and was then evolved to the stable state, the reading beam will not interact with the atomic object such that photons are not emitted. Moreover, the stable state has an energy level that is not similar to either state of the qubit space. For example, the stable state may be separated from both levels of the qubit space by at least 100 GHZ (e.g., at least one terahertz (THz)). The energy difference between the second state of the qubit space and the stable state is large enough that the reading operation is not affected by off resonant errors.

Figure 1:
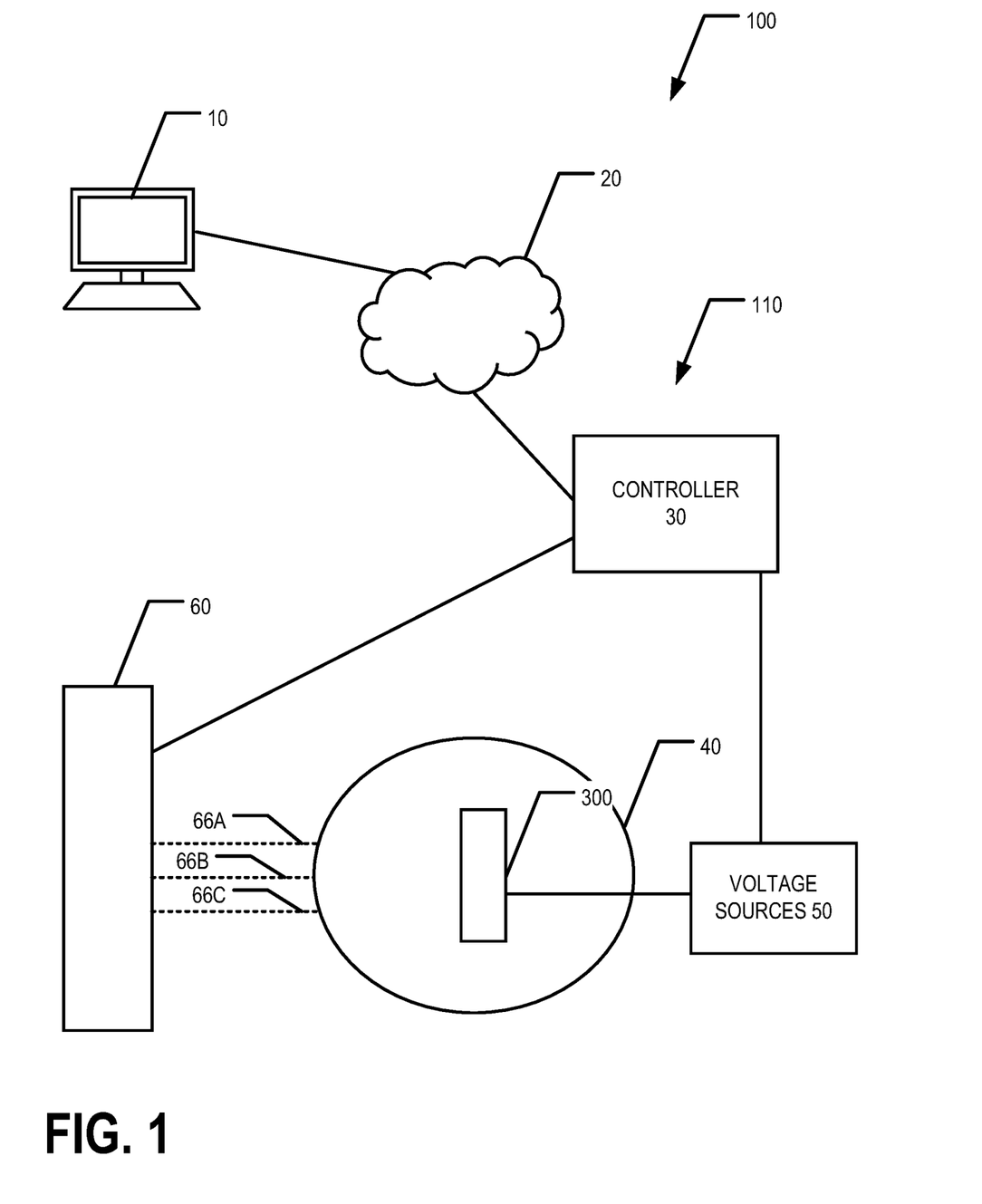
FIG. 1 is a schematic diagram illustrating an example quantum computing system comprising an atomic object confinement apparatus that may be used to perform a reading procedure of an example embodiment.

Exemplary Quantum Computing System Comprising an Atomic Object Confinement Apparatus FIG. 1 provides a schematic diagram of an example quantum computing system 100 comprising an atomic object confinement apparatus 300 (e.g., an ion trap and/or the like), in accordance with an example embodiment. In various embodiments, the quantum computing system 100 comprises a computing entity 10 and a quantum computer 110. In various embodiments, the quantum computer 110 comprises a controller 30, a cryostat and/or vacuum chamber 40 enclosing a confinement apparatus 300 (e.g., an ion trap), and one or more manipulation sources 60. For example, the cryostat and/or vacuum chamber 40 may be a pressure-controlled chamber. In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more atomic objects within the confinement apparatus. For example, the manipulation sources 60 may be configured to generate a first beam of a first wavelength $\lambda_1$, a second beam of a second wavelength $\lambda_2$, a third beam of a third wavelength $\lambda_3$, a fourth beam of the second wavelength $\lambda_2$, a reading beam of a reading wavelength, and/or the like. For example, in an example embodiment, wherein the one or more manipulation sources 60 comprise one or more lasers, the lasers may provide one or more laser beams to atomic objects trapped within the confinement apparatus 300 within the cryostat and/or vacuum chamber 40. In various embodiments, the first beam, second beam, third beam, fourth beam, and/or reading beam may be continuous or pulsed laser beams.

In various embodiments, the first wavelength $\lambda_1$ is substantially equal to 411 nm. In various embodiments, the first beam is generated by a first manipulation source 60 configured to generate a 411 nm beam with very good frequency stability. For example, in an example embodiment, the first beam is generated by a first manipulation source 60 to have a frequency of 729 THz with a frequency stability of less than 100 kHz. In other words, the first manipulation source 60 is configured to generate a first beam within 100 kHz of 729 THz.

In various embodiments, the second wavelength $\lambda_2$ is substantially equal to 3.4 μm. In various embodiments, the second beam is generated by a second manipulation source 60 configured to generate a 3.4 μm beam with very good frequency stability. For example, in an example embodiment, the second beam is generated by a second manipulation source 60 to have a frequency of 88.2 THz with a frequency stability of less than 100 kHz. In other words, the second manipulation source 60 is configured to generate a second beam within 100 kHz of 88.2 THz. In an example embodiment, the manipulation source configured to generate the second beam comprises a periodically poled lithium niobite (PPLN) waveguide. In an example embodiment, the manipulation source 60 configured to generate the second beam comprises a tunable Ti:S laser and a 1550 nm laser. In an example embodiment, the manipulation source 60 configured to generate the second beam comprises a 1064 nm source and/or laser and a tunable laser having a characteristic wavelength substantially equal to 1550 nm.

In various embodiments, the quantum computer 110 comprises an optics collection system configured to collect and/or detect photons generated by qubits (e.g., during reading procedures). The optics collection system may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits of the quantum computer. In various embodiments, the detectors may be in electronic communication with the controller 30 via one or more A/D converters 525 (see FIG. 5) and/or the like.

In various embodiments, the quantum computer 110 comprises one or more voltage sources 50. For example, the voltage sources 50 may comprise a plurality of voltage drivers and/or voltage sources and/or at least one RF driver and/or voltage source. The voltage sources 50 may be electrically coupled to the corresponding potential generating elements (e.g., electrodes) of the confinement apparatus 300, in an example embodiment.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms and/or circuits, and/or the like into a computing language, executable instructions, command sets, and/or the like that the controller 30 can understand and/or implement.

In various embodiments, the controller 30 is configured to control the voltage sources 50, cryostat system and/or vacuum system controlling the temperature and pressure within the cryostat and/or vacuum chamber 40, manipulation sources 60, and/or other systems controlling various environmental conditions (e.g., temperature, pressure, and/or the like) within the cryostat and/or vacuum chamber 40 and/or configured to manipulate and/or cause a controlled evolution of quantum states of one or more atomic objects within the confinement apparatus. For example, the controller 30 may cause a controlled evolution of quantum states of one or more atomic objects within the confinement apparatus to execute a quantum circuit and/or algorithm. For example, the controller 30 may cause a reading procedure comprising coherent shelving to be performed, possibly as part of executing a quantum circuit and/or algorithm. In various embodiments, the atomic objects confined within the confinement apparatus are used as qubits of the quantum computer 110.

Example Shelving Procedure

Figure 2:
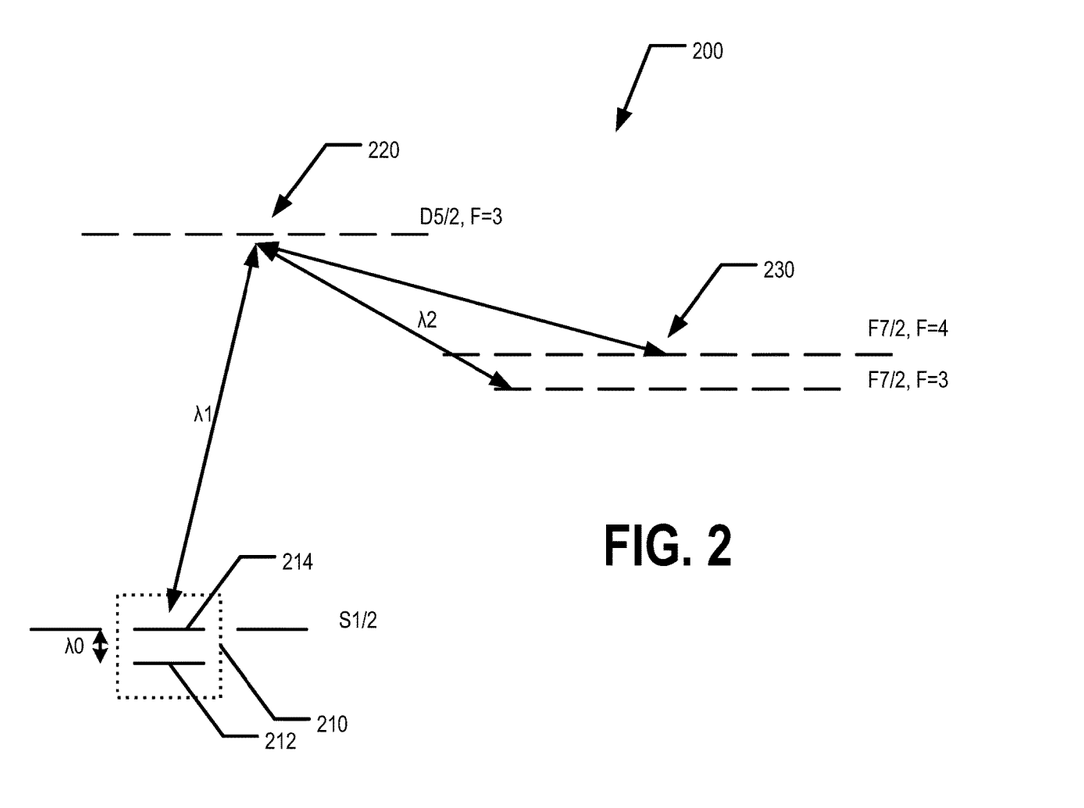
FIG. 2 is a schematic diagram of some of the energy levels of an example atomic object that may be used in performing a coherent shelving procedure, an example embodiment.

FIG. 2 illustrates a portion of an energy level diagram 200 for an example atomic object that may be used as a qubit of the quantum computing system, in an example embodiment. In particular, the atomic object acting as a qubit of the quantum computing system starts in one of the two states of the qubit space 210. For example, the qubit space 210 may comprise a first qubit state 212 of the l=0, m=0 hyperfine state of the ground state (e.g., the $S^{1/2}$ manifold) of the atomic object, which may be referred to as the zero or off state (e.g., $|0\rangle$) or the down state (e.g., $|\downarrow\rangle$), in various embodiments. The qubit space 210 may further comprise a second qubit state 214 of the l=1, m=0 hyperfine state of the ground state of the atomic object, which may be referred to as the one or on state (e.g., $|1\rangle$) or the up state (e.g., $|\uparrow\rangle$), in various embodiments. In various embodiments, the atomic object is an ion or atom. For example, the atomic object may be singly ionized Ytterbium. The atomic object being used as a qubit of the quantum system is also referred to herein simply as a qubit.

In various embodiments, the two states of the qubit space 210 may be separated by relatively small energy difference corresponding to a qubit state separation wavelength $\lambda_0$. For example, in an example embodiment, the two qubit states of the qubit space 210 are separated by an energy difference corresponding to a frequency difference of less than 20 GHz (e.g., less than 15 GHz or less than 13 GHz). In other words, the two states of the qubit space 210 are separated by less than $8.3\times10^{-5}$ eV (e.g., less than $6.2\times10^{-5}$ eV or less than $5.4\times10^{-5}$ eV), corresponding to a qubit separation wavelength $\lambda_0$ of at least 1.5 cm (e.g., at least 2.0 cm or at least 2.3 cm).

In various embodiments, the shelving procedure includes applying two beams such that the two beams are incident on the qubit. As used herein, the term "applying a beam" includes providing the beam and/or causing the beam to be incident on the atomic object and/or qubit. The two beams include a first beam of a first wavelength $\lambda_1$ and a second beam of a second wavelength $\lambda_2$. In various embodiments, the first and second beams may be applied simultaneously and/or at the same time, at overlapping times, and/or at alternating times. In an example embodiment, the first beam is applied and then, after the first beam has completed being incident on the atomic object, the second beam is applied.

In an example embodiment, the first and second beams may be applied in a phase coherent manner. For example, the first and second beams may be applied with the same phase in embodiments where the first and second beams are applied simultaneously and/or in an overlapping manner. For example, the first and second beams may be applied with a continuous phase in embodiments where the first and second beams are applied on the atomic object in an alternating manner or in a first beam and then second beam. For example, when the first and second beams are applied in an alternating manner, the phase of the first beam when the first beam stops being applied may be the phase of the second beam (e.g., possibly with a slight modification to account for any phase change during a time delay between when the first beam stopped being applied and the second beam started being applied) when the second beam starts to be applied. In various embodiments, the first and second beam may not be applied in a coherent manner. For example, the first and second beams may be applied with a particular phase offset, an evolving phase offset, and/or the like.

In an example embodiment, the first and second beams may be applied with a particular angle between the propagation direction of the first and second beams. For example, the first and second beams may propagate in the same direction (e.g., have substantially parallel directions of propagation), propagate in opposite directions (e.g., have substantially anti-parallel directions of propagation), propagate in orthonormal directions (e.g., have substantially perpendicular directions of propagation), or propagate with another angle between the directions of propagation of the first and second beams, as appropriate for the application. In an example embodiment, the first and second beams may be applied with a particular polarization offset. For example, the first and second beams may be applied with the same polarization, opposite polarizations (e.g., the first beam may be right-linear polarized and the second beam may be left-linear polarized or vice versa, the first beam may be right-hand circularly polarized and the second beam may be left-hand circularly polarized or vice versa), and/or the like, as appropriate for the application.

As noted above, the first beam has a first wavelength $\lambda_1$ and the second beam has a second wavelength $\lambda_2$. In an example embodiment, the first wavelength $\lambda_1$ is substantially equal to 411 nm and the second wavelength $\lambda_2$ is substantially equal to 3.4 μm. In various embodiments, the first wavelength $\lambda_1$ couples a first state of the qubit space 210 (e.g., the on state 214) to one or more states of an intermediate manifold 220. In the illustrated embodiment, the intermediate manifold 220 is the $D^{5/2}$ F=3 manifold. In various embodiments, the second wavelength $\lambda_2$ couples the one or more states of the intermediate manifold 220 to one or more stable states of a shelving manifold 230. In various embodiments, the coupling of the first state of the qubit space 210 to the one or more states of the intermediary manifold 220 and the one or more states of the intermediary manifold to the one or more stable states of the shelving manifold 230 is coherent. In the illustrated embodiment, the shelving manifold comprises the F=3 and F=4, $F^{7/2}$ manifold. The one or more stable states of the shelving manifold 230 each have a lifetime that is longer than the time needed to read the qubit. As should be understood, the one or more stable states of the shelving manifold 230 are outside of the qubit space 210. Moreover, the one or more stable states of the shelving manifold 230 each have an energy level that is not similar to either state of the qubit space 210. For example, the stable states may be separated from both levels of the qubit space by an energy difference corresponding to a frequency of at least 100 GHZ (e.g., at least one terahertz (THz)). The energy difference between the second state of the qubit space and the stable state is large enough that the reading operation is not affected and/or limited by off resonant errors.

Thus, when the qubit is in the first state of the qubit space 210 (e.g., the on state 214), application of the first and second beam to the qubit causes the qubit to transition from the first state of the qubit space 210 to a stable state of the shelving manifold 230 via the intermediary manifold 220. When the qubit is in the second state of the qubit space 210 (e.g., the off state 212), application of the first and second beam to the qubit does not affect the qubit. For example, the second state of the qubit space 210 is not coupled and/or is only very weakly coupled to the intermediate manifold 220 via the first wavelength $\lambda_1$. A reading beam may be applied to the qubit to see whether or not the qubit fluoresces. For example, the qubit will fluoresce in an instance where the qubit was in the second state of the qubit space and will not fluoresce in an instance where the qubit was originally in the first state of the qubit space and is now shelved in a stable state outside of the qubit space.

Figure 3:
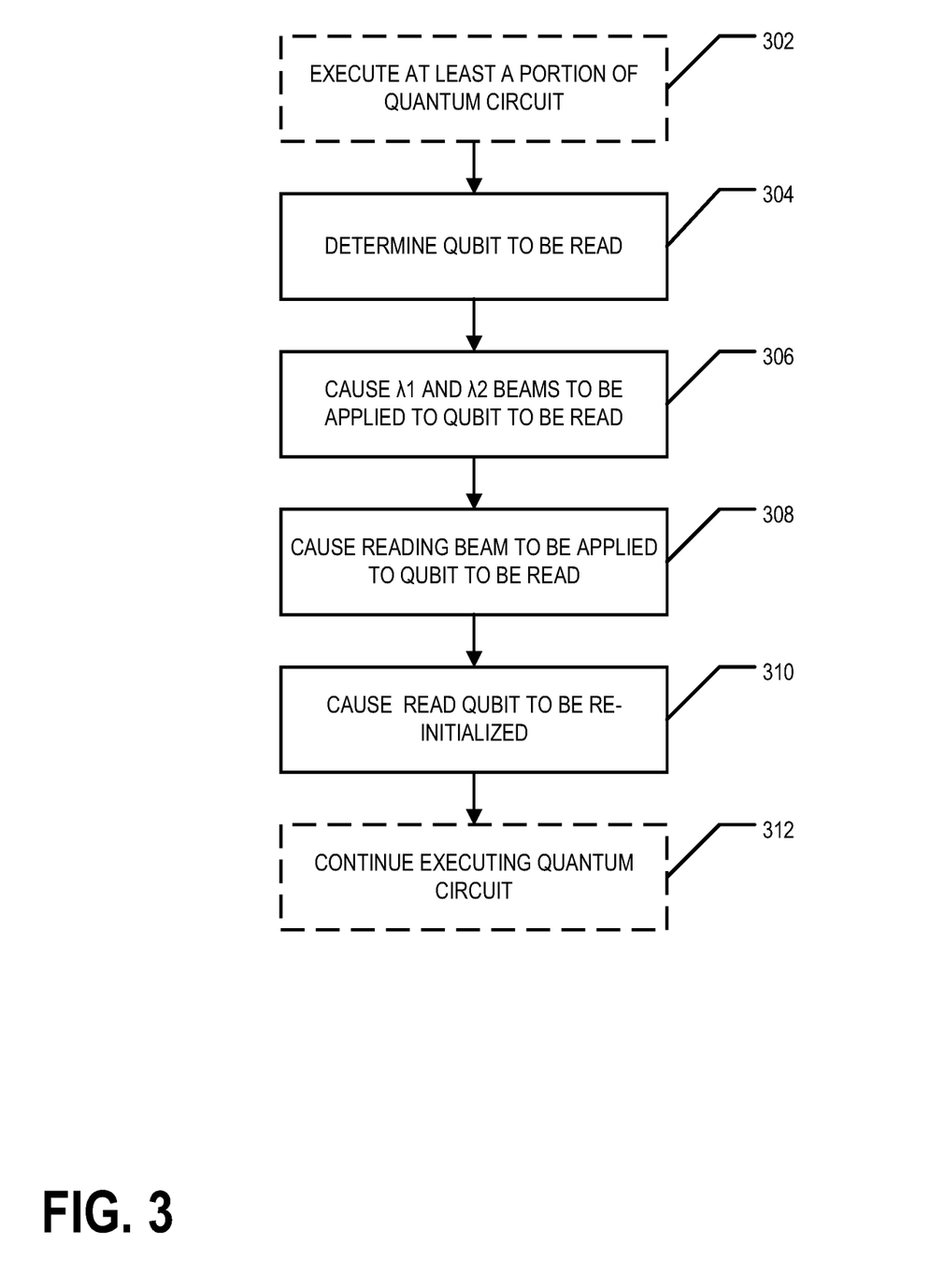
FIG. 3 is a flowchart illustrating various processes, operations, and/or procedures of a reading procedure including shelving, in accordance with an example embodiment.

FIG. 3 provides a flowchart illustrating various processes, operations, and/or procedures for executing at least a portion of a quantum algorithm and/or circuit that includes a reading procedure including shelving, in accordance with an example embodiment. In various embodiments, the processes, operations, and/or procedures shown in FIG. 3 are performed by a controller 30 of the quantum computing system 100.

Starting at step/operation 302, the controller 30 causes the quantum computer 110 to execute at least a portion of a quantum algorithm and/or circuit. For example, the controller 30 may comprise means, such as processing device 505, memory 510, driver controller elements 515, A/D converter (s) 525, and/or the like (see FIG. 5), for executing at least a portion of a quantum algorithm and/or circuit. For example, the controller 30 may receive a quantum algorithm and/or circuit provided by a computing entity 10, for example. The controller 30 may then queue a plurality of commands and execute the queue of commands to cause the at least a portion of the quantum algorithm and/or circuit to be executed. For example, executing the at least a portion of the quantum algorithm and/or circuit may comprise initializing one or more qubits (e.g., placing one or more atomic objects into the qubit space 210), transporting at least some of the one or more qubits to one or more particular locations within the atomic object confinement apparatus 300, performing one or more one and/or two and/or multi-qubit gates on at least some of the one or more qubits, and/or the like.

At step/operation 304, while causing the quantum computer 110 to execute at least a portion of the quantum algorithm and/or circuit, the controller 30 determines that a qubit is to be read. Reading a qubit generally comprises applying a reading beam to a qubit to cause the quantum state of the qubit to collapse into one of the states of the qubit space 210 and determining which state of the qubit space 210 the quantum state of the qubit collapsed into based on whether or not the qubit fluoresces. For example, the controller 30 may determine that an upcoming and/or next-to-be-executed set of commands corresponds to reading a qubit. For example, the controller 30 may comprise means, such as processing device 505, memory 510, and/or the like, for determining that an upcoming and/or next-to-be-executed set of commands corresponds to reading a qubit.

Responsive to determining that a qubit is to be read (and possibly transporting the qubit to be read to an appropriate location within the atomic object confinement apparatus 300), the controller 30 may cause a coherent shelving procedure to be performed on the qubit, at step/operation 306. For example, the controller 30 may cause a first manipulation source 60 to generate a first beam of a first wavelength $\lambda_1$ and cause the first beam to be applied to the qubit to be read. The controller 30 may cause a second manipulation source 60 to generate a second beam of a second wavelength $\lambda_2$ and cause the second beam to be applied to the qubit to be read. As described above, in various embodiments, the first and second beam may be applied simultaneously, in an overlapping manner, in an alternating manner, and/or the like. In an example embodiment, the first beam is applied and then the second beam is applied after the first beam has stopped being applied. For example, the controller 30 may comprise means, such as processing device 505, memory 510, driver controller elements 515, and/or the like, for causing the first manipulation source to apply the first beam and the second manipulation source to apply the second beam. As described above, the first and second beams may be applied with a particular phase relationship, particular relationship between the directions of propagation of the first and second beams, and/or with a particular relationship between the polarization of the first and second beams. In an example embodiment, the first and second beams may be applied for time of 10-50 μs (e.g., 10-30 μs. 20-40 μs, and/or the like).

At step/operation 308, the controller 30 causes a reading manipulation source 60 to apply a reading beam to the qubit to be read. As noted above, if the qubit has been shelved at step 306 (e.g., the qubit was in the first state of the qubit space 210 and thus has been coherently transitioned to a stable state of the shelving manifold 230), the qubit will not fluoresce in response to the reading beam being applied to the qubit. If the qubit was not shelved at step 306 (e.g., the qubit was and is in the second state of the qubit space 210 and thus has not been transitioned to the stable state of the shelving manifold 230), the qubit will fluoresce in response to the reading beam being applied to the qubit. The controller 30 then receives a signal from an optics collection system of the quantum computer 110 indicating whether fluorescence was detected/observed or not detected/observed. Based on the received signal, the controller 30 determines which state within the qubit space 210 the quantum state of the qubit collapsed into (e.g., the on state 214 and/or the off state 212). For example, the controller 30 comprises means, such as processing device 505, memory 510, driver controller elements 515, A/D converter(s) 525, and/or the like, for causing a reading manipulation source to apply a reading beam to the qubit to be read, receive a signal indicating whether or not fluorescence of the qubit was detected/observed responsive to application of the reading beam, and determining the quantum state of the qubit.

At step/operation 310, the controller 30 causes the read qubit to be re-initialized. In various embodiments, re-initializing the qubit includes performing a de-shelving procedure. In an example embodiment, the de-shelving procedure is only performed if it was determined at step/operation 308 that the quantum state of the qubit collapsed into the first state of the qubit space 210 and therefore was shelved during the reading procedure (e.g., fluorescence was not detected/observed). For example, the controller 30 may comprise means, such as processing device 505, memory 510, driver controller elements 515, A/D converter(s) 525, and/or the like, to cause the qubit to be re-initialized, possibly via a de-shelving procedure. In various embodiments, re-initializing the qubit may include one or more additional steps and/or operations in addition to de-shelving the qubit such that the qubit is in a known state in the qubit space 210.

Figure 4:
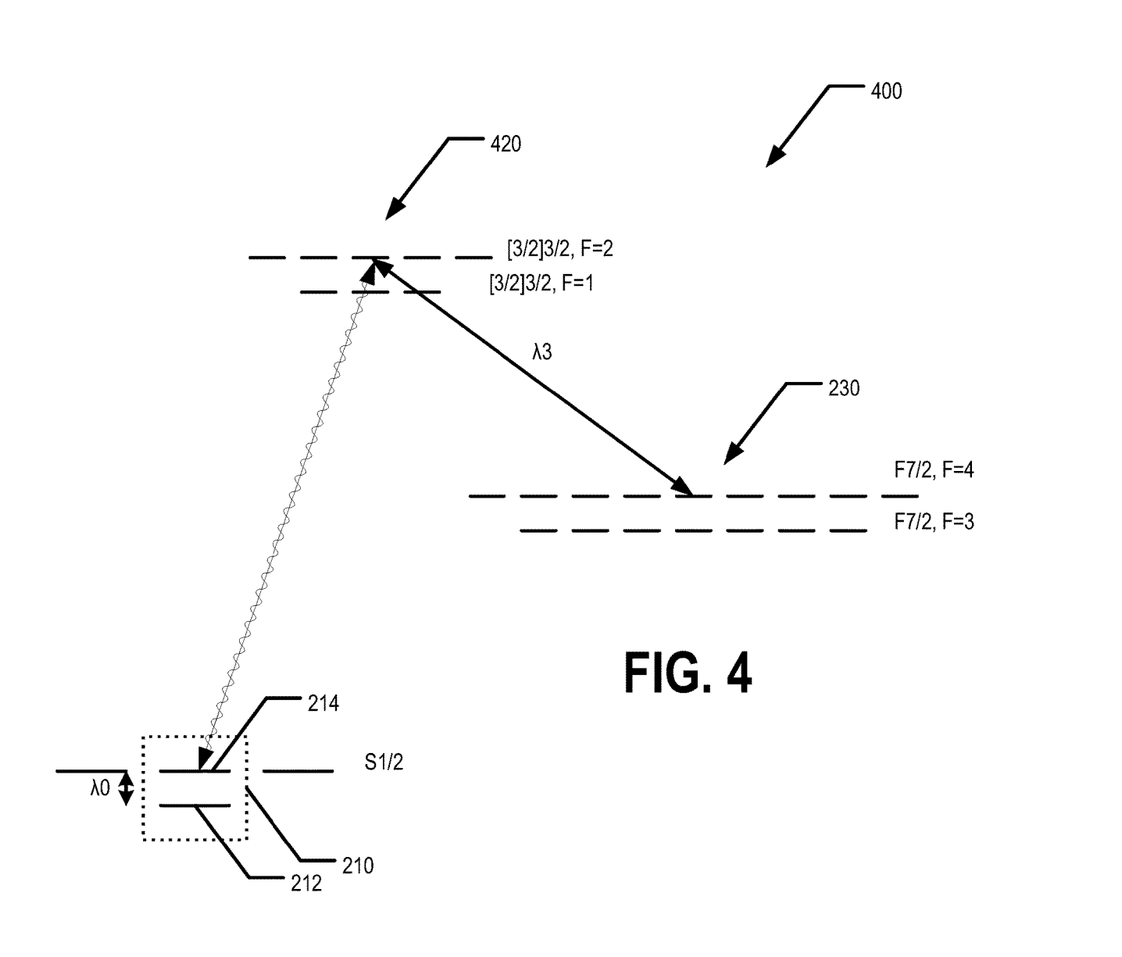
FIG. 4 is a schematic diagram of some of the energy levels of an example atomic object that may be used to perform a de-shelving procedure after performing a reading procedure including shelving, in accordance with an example embodiment.

FIG. 4 illustrates a portion of an energy level diagram 400 for an example atomic object that may be used as a qubit of the quantum computing system, in an example embodiment. When a qubit is shelved (e.g., at step/operation 306), the qubit is transitioned to a stable state in the shelving manifold 230. To de-shelve the qubit and bring the qubit back into the qubit space 210, a de-shelving procedure is performed. In various embodiments, the de-shelving procedure comprises applying a third beam of a third wavelength $\lambda_3$ and a fourth wavelength of the second wavelength $\lambda_2$ in a simultaneous and/or at least partially overlapping manner. For example, the third beam is incident on the qubit for at least a portion of the same time that the fourth beam is incident on the qubit. The third and fourth beams couple the one or more stable states of the shelving manifold to one or more states of a temporary manifold 420. In an example embodiment, the third and fourth beams coherently couple the one or more stable states of the shelving manifold to one or more states of the temporary manifold 420. In various embodiments, the qubit decays quickly from the one or more states of the temporary manifold 420 to back into the qubit space 210. In the illustrated embodiment, the temporary manifold 420 comprises the F=1 and F=2, $[3/2]^{3/2}$ manifold. In an example embodiment, the third and fourth beams are applied such that the overlapping time of the third and fourth beams being applied is in the range of 10 ns to 15 μs (e.g., 8-12 μs, 10 μs, and/or the like).

For example, the controller 30 may cause a third manipulation source to generate a third beam of a third wavelength $\lambda_3$ and the second manipulation source (or a fourth manipulation source) to generate a fourth beam of the second wavelength $\lambda_2$ such that the third and fourth beams are applied to the qubit simultaneously and/or in an at least partially overlapping manner. In various embodiments, the third wavelength $\lambda_3$ is substantially equal to 976 nm and the second wavelength $\lambda_2$ is substantially equal to 3.4 μm. The qubit may then be allowed to decay (e.g., spontaneously) back into the qubit space 210.

In an example embodiment, the third and fourth beams may be applied in a phase coherent manner. For example, the third and fourth beams may be applied with the same phase. In various embodiments, the third and fourth beam may not be applied in a coherent manner. For example, the third and fourth beams may be applied with a particular phase offset, an evolving phase offset, and/or the like. In an example embodiment, the third and fourth beams may be applied with a particular angle between the propagation direction of the third and fourth beams. For example, the third and fourth beams may propagate in the same direction (e.g., have substantially parallel directions of propagation), propagate in opposite directions (e.g., have substantially anti-parallel directions of propagation), propagate in orthonormal directions (e.g., have substantially perpendicular directions of propagation), or propagate with another angle between the directions of propagation of the first and second beams, as appropriate for the application. In an example embodiment, the third and fourth beams may be applied with a particular polarization offset. For example, the third and fourth beams may be applied with the same polarization, opposite polarizations (e.g., the third beam may be right-linear polarized and the fourth beam may be left-linear polarized or vice versa, the third beam may be right-hand circularly polarized and the fourth beam may be left-hand circularly polarized or vice versa), and/or the like, as appropriate for the application.

Continuing with FIG. 3, at step/operation 312, the controller 30 may cause the quantum computer to continue executing the remainder and/or another portion of the quantum algorithm and/or circuit. For example, the controller 30 may comprise means, such as processing device 505, memory 510, driver controller elements 515, A/D converter (s) 525, and/or the like (see FIG. 5), for executing an additional and/or remaining portion of the quantum algorithm and/or circuit. For example, the controller 30 may continue to execute the queue of commands to cause the additional and/or remaining portion of the quantum algorithm and/or circuit to be executed. For example, executing the additional and/or remaining portion of the quantum algorithm and/or circuit may comprise initializing one or more qubits (e.g., placing one or more atomic objects into the qubit space 210), transporting at least some of the one or more qubits to one or more particular locations within the atomic object confinement apparatus 300, performing one or more one and/or two and/or multi-qubit gates on at least some of the one or more qubits, reading at least some of the one or more qubits, and/or the like. In an example embodiment, the additional and/or remaining portion of the quantum algorithm and/or circuit may be modified based on the quantum state of the qubit determined at step/operation 308.

Technical Advantages

Various embodiments provide technical solutions to the technical problems regarding determining a quantum state of an atomic object when the atomic object is expected to be in a quantum state that is close in energy to another quantum state of the atomic object. In particular, various embodiments provide technical solutions relating to coherently shelving atomic objects that are in a first quantum state of a set of quantum states that are close in energy such that it may be determined whether or not the atomic object is in a second quantum state of the set of quantum states that are close in energy without limiting the determination by off resonant errors. The coherent shelving described herein is significantly faster than conventional (incoherent) shelving techniques. For example, conventional (incoherent) shelving techniques occur on a time scale of approximately 30 ms. The coherent shelving of various embodiments requires approximately 10-50 µs, or three orders of magnitude faster than the conventional (incoherent) shelving. Various embodiments apply these technical solutions to the reading of a qubit of a quantum computer where the qubit is an atomic object and the qubit space defines the two qubit states that are separated by a small energy difference (e.g., 20 GHz or less). Thus, various embodiments provide technical improvements to the technical field of accurately determining an quantum state of an atomic object. Some embodiments provide technical improvements to the technical field of reading a qubit of a quantum computer (e.g., a trapped atomic object quantum computer using hyperfine structure to define a qubit space).

Exemplary Controller

Figure 5:
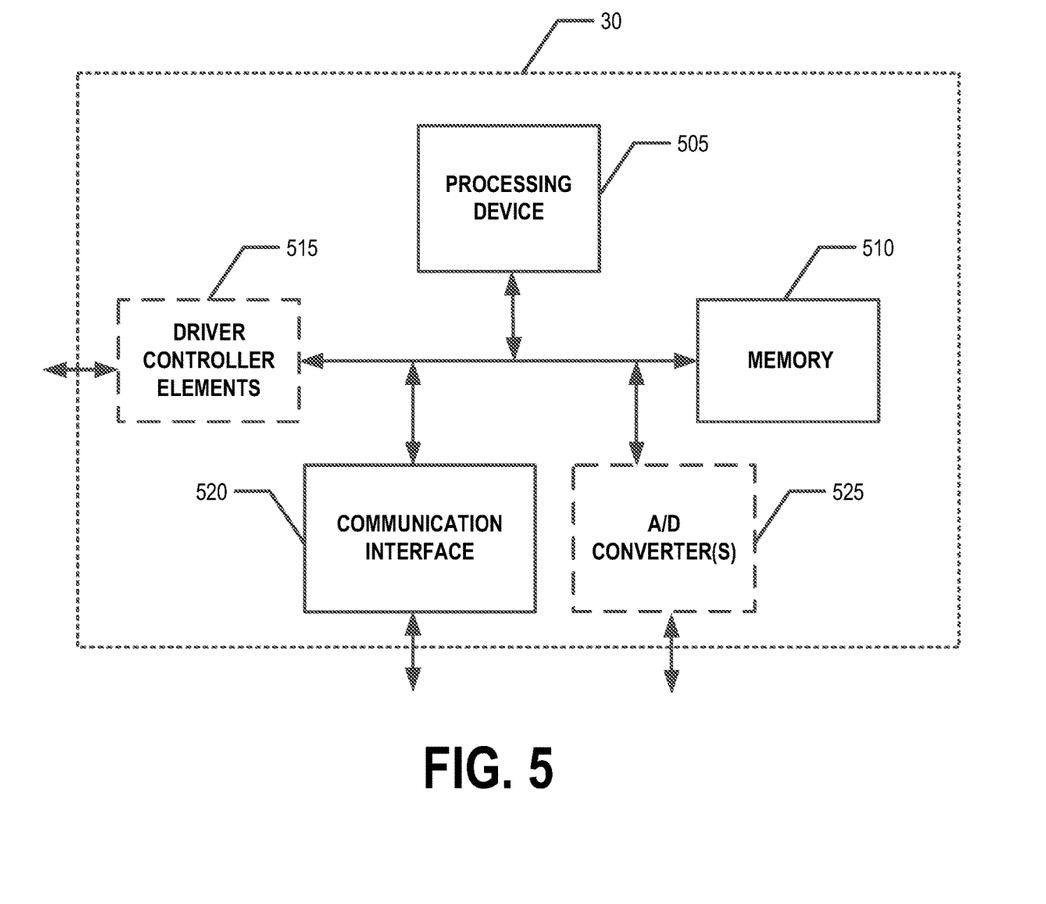
FIG. 5 provides a schematic diagram of an example controller of a quantum computer configured to perform one or more deterministic reshaping and/or reordering functions, according to various embodiments.

In various embodiments, a confinement apparatus 300 is incorporated into a system (e.g., a quantum computer 110) comprising a controller 30. In various embodiments, the controller 30 is configured to control various elements of the system (e.g., quantum computer 110). For example, the controller 30 may be configured to control the voltage sources 50, a cryostat system and/or vacuum system controlling the temperature and pressure within the cryostat and/or vacuum chamber 40, manipulation sources 60, cooling system, and/or other systems controlling the environmental conditions (e.g., temperature, humidity, pressure, and/or the like) within the cryostat and/or vacuum chamber 40 and/or configured to manipulate and/or cause a controlled evolution of quantum states of one or more atomic objects within the confinement apparatus. In various embodiments, the controller 30 may be configured to receive signals from one or more optics collection systems.

As shown in FIG. 5, in various embodiments, the controller 30 may comprise various controller elements including processing elements 505, memory 510, driver controller elements 515, a communication interface 520, analog-digital converter elements 525, and/or the like. For example, the processing elements 505 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. The term circuitry may refer to an entirely hardware embodiment or a combination of hardware and computer program products. In an example embodiment, the processing element 505 of the controller 30 comprises a clock and/or is in communication with a clock.

For example, the memory 510 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 510 may store a queue of commands to be executed to cause a quantum algorithm and/or circuit to be executed (e.g., an executable queue), qubit records corresponding the qubits of quantum computer (e.g., in a qubit record data store, qubit record database, qubit record table, and/or the like), a calibration table, computer program code (e.g., in a one or more computer languages, specialized controller language(s), and/or the like), and/or the like. In an example embodiment, execution of at least a portion of the computer program code stored in the memory 510 (e.g., by a processing element 505) causes the controller 30 to perform one or more steps, operations, processes, procedures and/or the like described herein for performing a qubit reading procedure including a shelving procedure (and a de-shelving procedure).

In various embodiments, the driver controller elements 510 may include one or more drivers and/or controller elements each configured to control one or more drivers. In various embodiments, the driver controller elements 510 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 505). In various embodiments, the driver controller elements 515 may enable the controller 30 to operate a voltage sources 50, manipulation sources 60, cooling system, and/or the like. In various embodiments, the drivers may be laser drivers; vacuum component drivers; drivers for controlling the flow of current and/or voltage applied to electrodes used for maintaining and/or controlling the trapping potential of the confinement apparatus 300 (and/or other drivers for providing driver action sequences to potential generating elements of the confinement apparatus); cryostat and/or vacuum system component drivers; cooling system drivers, and/or the like. In various embodiments, the controller 30 comprises means for communicating and/or receiving signals from one or more optical receiver components (e.g., of the optics collection system). For example, the controller 30 may comprise one or more analog-digital converter elements 525 configured to receive signals from one or more optical receiver components (e.g., a photodetector of the optics collection system), calibration sensors, and/or the like.

In various embodiments, the controller 30 may comprise a communication interface 520 for interfacing and/or communicating with a computing entity 10. For example, the controller 30 may comprise a communication interface 520 for receiving executable instructions, command sets, and/or the like from the computing entity 10 and providing output received from the quantum computer 110 (e.g., from an optical collection system) and/or the result of a processing the output to the computing entity 10. In various embodiments, the computing entity 10 and the controller 30 may communicate via a direct wired and/or wireless connection and/or via one or more wired and/or wireless networks 20.

Exemplary Computing Entity

Figure 6:
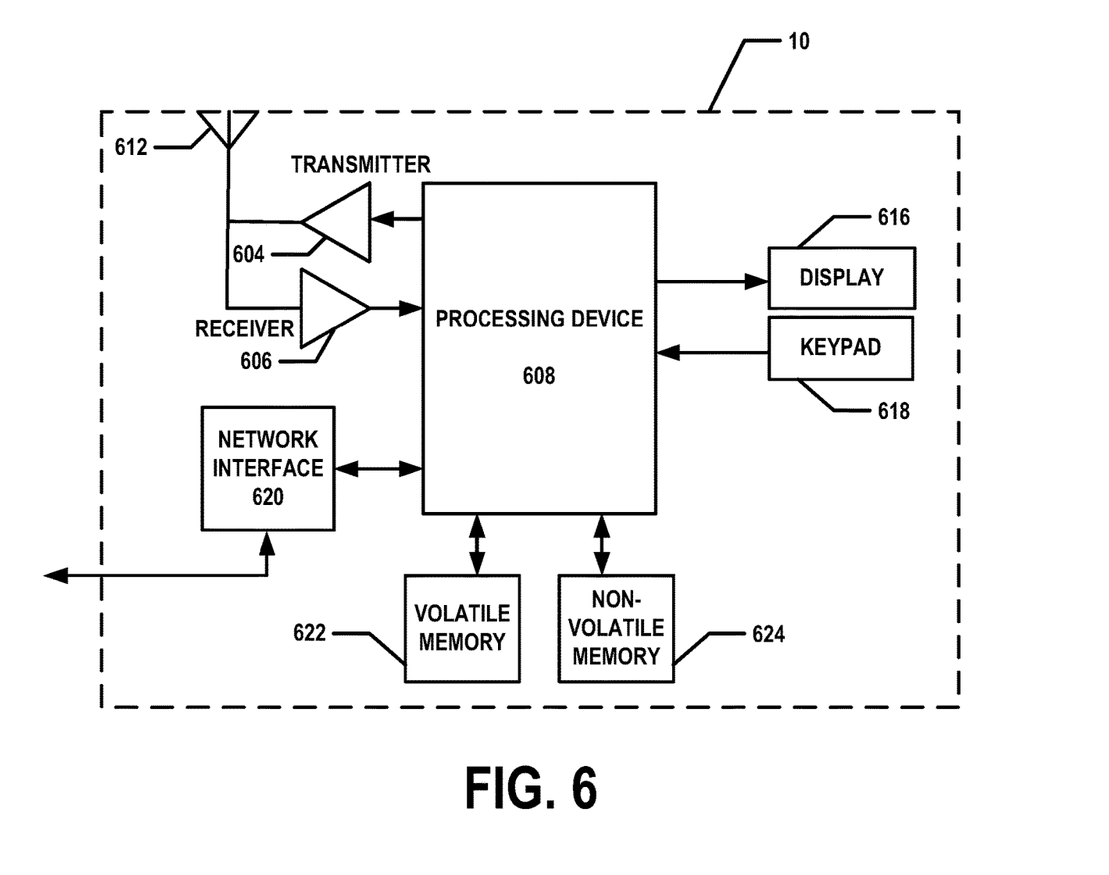
FIG. 6 provides a schematic diagram of an example computing entity of a quantum computer system that may be used in accordance with an example embodiment.

FIG. 6 provides an illustrative schematic representative of an example computing entity 10 that can be used in conjunction with embodiments of the present invention. In various embodiments, a computing entity 10 is configured to allow a user to provide input to the quantum computer 110

(e.g., via a user interface of the computing entity 10) and receive, display, analyze, and/or the like output from the quantum computer 110.

As shown in FIG. 6, a computing entity 10 can include an antenna 612, a transmitter 604 (e.g., radio), a receiver 606 (e.g., radio), and a processing element 608 that provides signals to and receives signals from the transmitter 604 and receiver 606, respectively. The signals provided to and received from the transmitter 604 and the receiver 606, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 616 and/or speaker/speaker driver coupled to a processing element 608 and a touch screen, keyboard, mouse, and/or microphone coupled to a processing element 608). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 618 (hard or soft), a touch display, voice/speech or motion interfaces, scanners, readers, or other input device. In embodiments including a keypad 618, the keypad 618 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 622 and/or non-volatile storage or memory 624, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SWIM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for reading a qubit of a trapped ion quantum computer, the method comprising:
   causing, by a controller of the trapped ion quantum computer, a first beam of a first wavelength and a second beam of a second wavelength to be incident on the qubit, wherein the first wavelength and the second wavelength are configured to couple a state of a qubit space of the qubit to a stable state, wherein the stable state has a lifetime that is longer than a length of time required for performing a reading operation; and causing, by the controller, the reading operation to be performed on the qubit.

2. The method of claim 1, wherein the qubit is a singly ionized ytterbium atom, the first wavelength is 411 nm, the second wavelength is 3.4 microns, and the stable state is in an F manifold of an atomic object being used as the qubit.

3. The method of claim 1, further comprising:
receiving, by the controller, a signal from photodetector; and
determining, by the controller and based on the signal, a quantum state of the qubit.

4. The method of claim 1, further comprising re-initializing the qubit.

5. The method of claim 4, wherein re-initializing the qubit comprises causing a third beam of a third wavelength and a fourth beam of the second wavelength to be incident on the qubit.

6. The method of claim 5, wherein the third beam and the fourth beam are incident on the qubit at least partially overlapping in time.

7. The method of claim 5, wherein the qubit is a singly ionized ytterbium atom, the second wavelength is 3.4 microns, and the third wavelength is 976 nm.

8. The method of claim 5, wherein the third beam and the fourth beam are incident on the qubit for a period of time that is less than 15 microseconds.

9. The method of claim 1, further comprising, while executing a quantum circuit, determining that the qubit is to be read, wherein the first beam and second beam are caused to be incident on the qubit responsive to determining that the qubit is to be read.

10. The method of claim 9, further comprising, after re-initializing the qubit, using the qubit to continue execution of the quantum circuit.

11. The method of claim 1, wherein causing the reading operation to be performed comprises causing a reading beam to be incident on the qubit and monitoring a signal generated by a photodetector to determine whether or not the qubit fluoresces responsive to the reading beam being incident on the qubit.

12. A controller of a trapped ion quantum computer, the controller comprising at least one processing device, the at least one processing device in communication with at least one manipulation source driver, the at least one processing device configured to cause the controller to:
cause a first beam of a first wavelength and a second beam of a second wavelength to be incident on a qubit, wherein the first wavelength and the second wavelength are configured to couple a state of a qubit space of the qubit to a stable state, wherein the stable state has a lifetime that is longer than a length of time required for performing a reading operation and the first beam and the second beam generated by at least one manipulation source operated by the at least one manipulation source driver; and
cause a reading beam to be incident on the qubit.

13. The controller of claim 12, wherein the qubit is a singly ionized ytterbium atom, the first wavelength is 411 nm, the second wavelength is 3.4 microns, and the stable state is in an F manifold of an atomic object being used as the qubit.

14. The controller of claim 12, wherein the at least one processing device is in communication with an photodetector and the at least one processing device is further configured to cause the controller to:
receive a signal from the photodetector, wherein the signal corresponds to a result of the reading beam being incident on the qubit; and
determine, based on the signal, a state of the qubit.

15. The controller of claim 12, wherein the at least one processing device is further configured to cause the controller to re-initialize the qubit.

16. The controller of claim 15, wherein re-initializing the qubit comprises causing a third beam of a third wavelength and a fourth beam of the second wavelength to be incident on the qubit.

17. The controller of claim 16, wherein the third beam and the fourth beam are incident on the qubit at least partially overlapping in time.

18. The controller of claim 16, wherein the qubit is a singly ionized ytterbium atom, the second wavelength is 3.4 microns, and the third wavelength is 976 nm.

19. The controller of claim 16, wherein the third beam and the fourth beam are incident on the qubit for a period of time that is less than 15 microseconds.

20. The controller of claim 12, wherein to cause the reading operation to be performed, the at least one processing device is configured to cause a reading beam to be incident on the qubit and monitor a signal generated by a photodetector to determine whether or not the qubit fluoresces responsive to the reading beam being incident on the qubit.

* * * * *

UNITED STATES PATENT AND TRADEMARK OFFICE
CERTIFICATE OF CORRECTION

| | |
|---|---|
| PATENT NO. | : 12,051,519 B2 |
| APPLICATION NO. | : 17/583308 |
| DATED | : July 30, 2024 |
| INVENTOR(S) | : Anthony Ransford et al. |

It is certified that error appears in the above-identified patent and that said Letters Patent is hereby corrected as shown below:

On the Title Page

Item (54) and in the Specification, Column 1, Line 2, In the Title, delete "SHEL VING" and insert -- SHELVING --, therefor.

Signed and Sealed this
Tenth Day of December, 2024

Katherine Kelly Vidal
*Director of the United States Patent and Trademark Office*